(12) United States Patent
Okuno et al.

(10) Patent No.: US 12,483,775 B2
(45) Date of Patent: Nov. 25, 2025

(54) SEE-THROUGH IMAGE DISPLAY SYSTEM AND METHOD

(71) Applicant: Honda Motor Co., Ltd., Tokyo (JP)

(72) Inventors: Yasuhiro Okuno, Tokyo (JP); Sukeyuki Shinotsuka, Tokyo (JP); Shoji Matsuda, Tokyo (JP); Yu Tanabe, Tokyo (JP); Daiki Kurei, Tokyo (JP); Yosuke Tanaka, Tokyo (JP); Shunsuke Torigai, Tokyo (JP); Yu Kurokawa, Tokyo (JP); Ryusei Homma, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 42 days.

(21) Appl. No.: 18/660,253

(22) Filed: May 10, 2024

(65) Prior Publication Data
US 2025/0047967 A1  Feb. 6, 2025

(30) Foreign Application Priority Data

Aug. 1, 2023 (CN) .......................... 202310956035.1

(51) Int. Cl.
*H04N 23/63* (2023.01)
*H04N 5/262* (2006.01)
(Continued)

(52) U.S. Cl.
CPC .......... *H04N 23/63* (2023.01); *H04N 5/2628* (2013.01); *H04N 23/45* (2023.01); *H04N 23/611* (2023.01); *H04N 23/69* (2023.01); *H04N 23/90* (2023.01)

(58) Field of Classification Search
None
See application file for complete search history.

(56) References Cited

U.S. PATENT DOCUMENTS 11,146,780 B1 *  10/2021  Abileah ................. G06V 40/18
2016/0065903 A1 *  3/2016  Wang ..................... G06V 40/19
                                                                          348/148

(Continued)

FOREIGN PATENT DOCUMENTS

JP  2013061988  4/2013
JP  2015022589  2/2015
(Continued)

*Primary Examiner* — Paul M Berardesca
(74) *Attorney, Agent, or Firm* — JCIPRNET

(57) ABSTRACT

Disclosed are a see-through image display system and method. The see-through image display system includes: an image capturing device for photographer, configured to capture a photographer; a plurality of image capturing devices for object to be captured, configured to capture a target object to be captured; a viewing angle detection portion, configured to detect a viewing angle of the photographer according to an image of the photographer captured by the image capturing device for photographer; an image connection portion, configured to connect an overlapping portion of the images of object to be captured that are captured by the image capturing devices for object to be captured, so as to connect the images; an image generating portion, configured to perform homograph transformation on the images of object to be captured that are connected by the image connection portion based on the viewing angle of the photographer to generate a see-through image.

5 Claims, 15 Drawing Sheets

(51) Int. Cl.
*H04N 23/45* (2023.01)
*H04N 23/611* (2023.01)
*H04N 23/69* (2023.01)
*H04N 23/90* (2023.01)

(56) References Cited

U.S. PATENT DOCUMENTS

2022/0094857 A1* 3/2022 Shimizu ................. H04N 23/90
2023/0410699 A1* 12/2023 Clark ..................... G09G 3/001
2024/0056563 A1* 2/2024 Nair ......................... G06T 5/70

FOREIGN PATENT DOCUMENTS

| JP | 2018112790 | 7/2018 |
| JP | 2020006913 | 1/2020 |
| JP | 2020080074 | 5/2020 |

\* cited by examiner

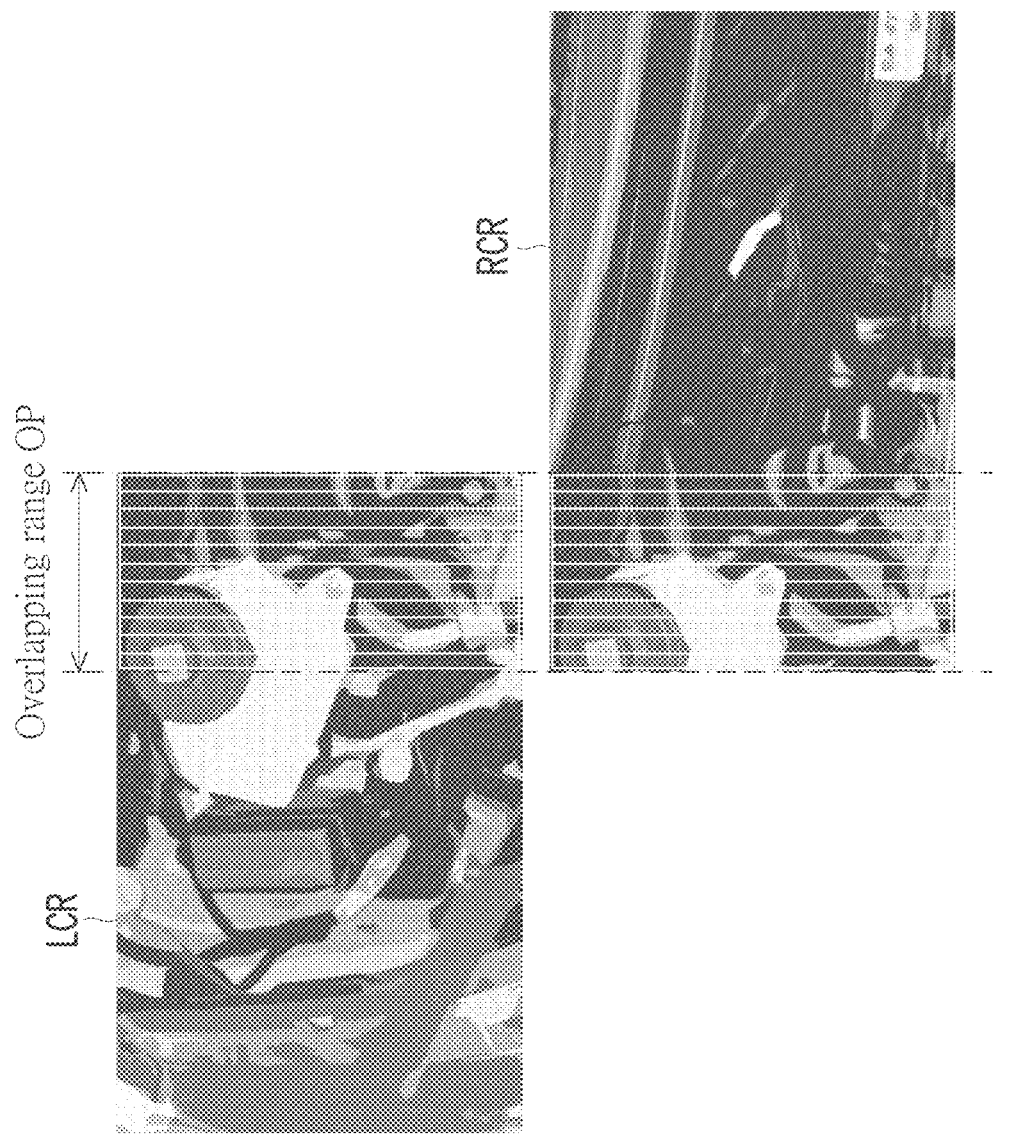

SEE-THROUGH IMAGE DISPLAY SYSTEM AND METHOD

CROSS-REFERENCE TO RELATED APPLICATION

This application claims the priority benefit of China application no. 202310956035.1, filed on Aug. 1, 2023. The entirety of the above-mentioned patent application is hereby incorporated by reference herein and made a part of this specification.

BACKGROUND

Technical Field

The present disclosure relates to a see-through image display system and method.

Description of Related Art

In recent years, in order to ensure access to affordable, reliable, sustainable, and advanced energy for more people, research and development to improve fuel efficiency that contribute to energy efficiency are being carried out.

Homograph transformation is normally adopted for performing see-through image display. However, since homograph transformation is a deformation process of a two-dimensional image, distortion will occur to images of three-dimensional objects with depth. The depth information used in homograph transformations is the length of a vertical line corresponding to a two-dimensional surface. Therefore, it is impossible to find the optimal "distance to the target object" for generating multiple candidate three-dimensional structures. In order to perform homograph transformations, measurement of the distance to the object to be captured is required.

When capturing an object to be captured using a portable camera device that integrates a camera and a display, such as a smartphone or a tablet, in the case where the position of the photographer's eyes differs from the actual field of view (viewing angle) determined by feature points in the environment, the position and the viewing angle of the camera of the portable camera device also vary. There will be inconsistencies, such as positional deviation (shift), color shift, size (enlargement or reduction), between the "real scene" perceived by the photographer and the "displayed image". It is already known that inconsistency (incongruity) occurs between visual information and somatosensory information perceived by the photographer.

If there is an inconsistency (incongruity) between the visual information and somatosensory information perceived by the photographer, especially when the object to be captured is being moved so that the object to be captured is within the camera's field of view while the photographer is viewing the "displayed image" during the capturing operation, it is necessary for the photographer (user) to get used to searching for the object to be captured under the condition where the display range of screen is narrower than the field of view. It takes a while for the photographer (user) to get used to performing search under such condition, and photographer's (user's) concentration is also required.

Patent Document 1 (Japanese Laid Open Patent Publication No. 2013-061988) discloses a display control device, a display control method, and a display control program. Patent Document 2 (Japanese Laid Open Patent Publication No. 2018-112790) discloses an information processing device and its control method and program. Patent Document 3 (Japanese Laid Open Patent Publication No. 2020-006913) discloses a dominant eye determining device. Patent Document 4 (Japanese Laid Open Patent Publication No. 2020-080074) discloses a line of sight detection device, a program, and a line of sight detection method. However, if the state of a specific object cannot be determined, the distance cannot be calculated. Therefore, homograph transformation is not applicable.

However, in the present disclosure, the problem to be solved is how to generate a see-through image that does not cause incongruity without measuring the distance to the object to be captured.

SUMMARY

In order to solve the above-mentioned problem, the present disclosure aims to achieve a see-through image display without measuring the distance to the object to be captured and causing incongruity. Furthermore, the present disclosure contributes to energy efficiency.

According to an embodiment of the present disclosure, a see-through image display system is provided. The see-through image display system includes: an image capturing device for a photographer, configured to capture a photographer; a plurality of image capturing devices for an object to be captured, configured to capture a target object to be captured; a viewing angle detection portion, configured to detect a viewing angle of the photographer according to an image of the photographer captured by the image capturing device for a photographer; an image connection portion, configured to connect an overlapping portion of the images of the object to be captured that are captured by the plurality of image capturing devices for the object to be captured, so as to connect the plurality of images; an image generating portion, configured to perform homograph transformation on the plurality of images of the object to be captured that are connected by the image connection portion based on the viewing angle of the photographer to generate a see-through image.

According to another embodiment of the present disclosure, a see-through image display method is provided. The see-through image display method includes: capturing a photographer to obtain an image of the photographer; capturing a target object to be captured; detecting a viewing angle of the photographer according to the image of the photographer; connecting an overlapping portion of the images of the object to be captured that are captured, so as to connect the plurality of images; performing homograph transformation on the plurality of images of the object to be captured that are connected based on the viewing angle of the photographer to generate a see-through image.

According to embodiments of the present disclosure, it is still possible to perform homograph transformation without measuring the distance to the object to be captured, and a see-through image is displayed without causing incongruity.

BRIEF DESCRIPTION OF THE DRAWINGS

FIG. 8B illustrates a method of determining connecting lines when overlaying images according to an embodiment of the present disclosure.

DESCRIPTION OF THE EMBODIMENTS

Figure 1:
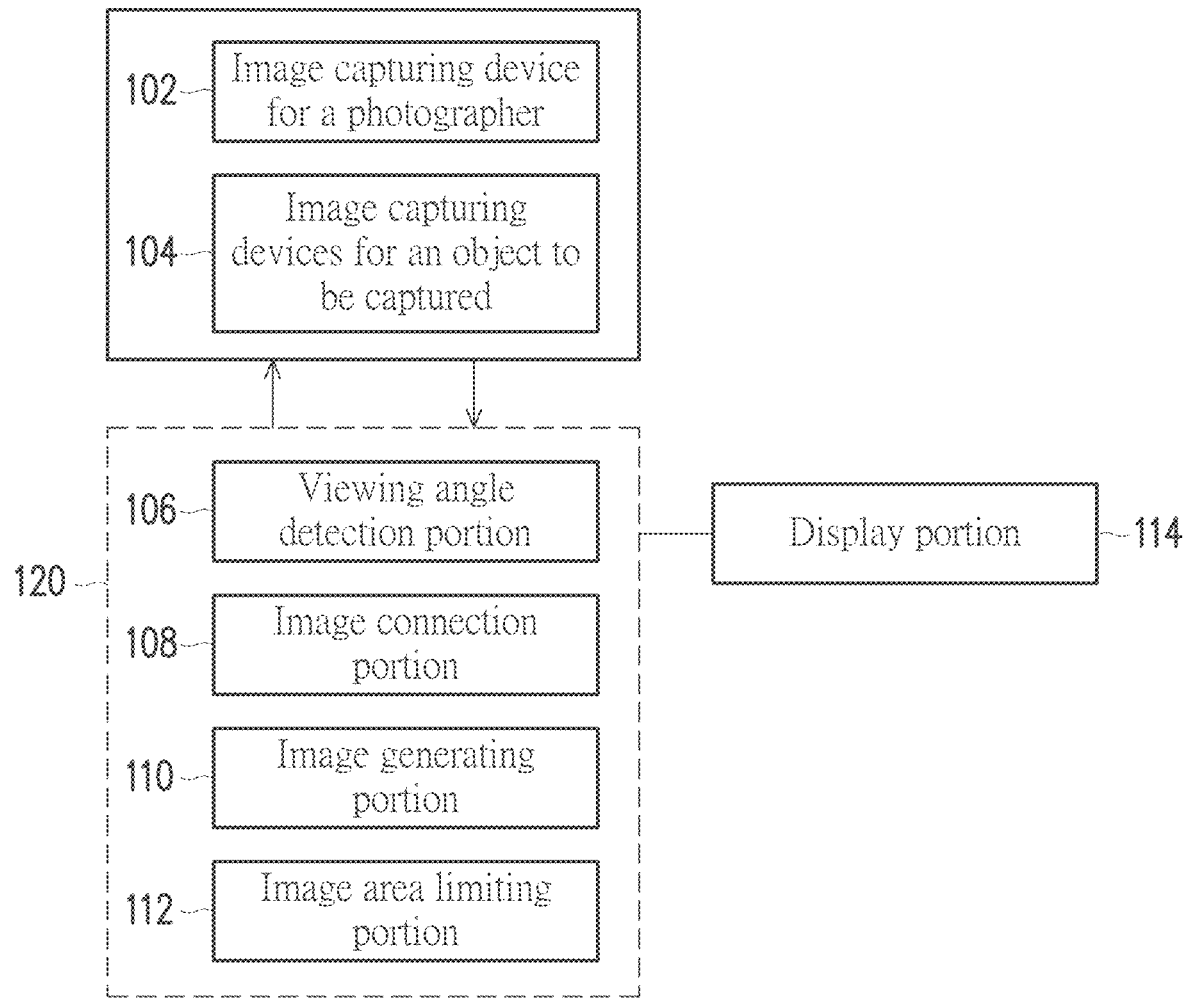
FIG. 1 is an architectural schematic diagram of a see-through image display system according to an embodiment of the present disclosure.

Reference will now be made in detail to the exemplary embodiments of the present disclosure, examples of which are illustrated in the accompanying drawings. Whenever possible, the same reference numbers are used in the drawings and descriptions to refer to the same or similar parts.

According to an embodiment of the present disclosure, the see-through image display system further includes: an image area limiting portion that limits the viewing angle of one end of the image of the object to be captured that is captured by the plurality of image capturing devices for the object to be captured along the viewing angle detected by the viewing angle detection portion.

According to an embodiment of the present disclosure, in the above see-through image display system, the focus position of the lens of each of the plurality of image capturing devices for an object to be captured is located on an end portion of a display portion of the see-through image display system.

According to an embodiment of the present disclosure, the above see-through image display method further includes: limiting the viewing angle of one end of the image of the object to be captured along the detected viewing angle of the image of the photographer.

FIG. 1 is an architectural schematic diagram of a see-through image display system according to an embodiment of the present disclosure. As shown in FIG. 1, the see-through image display system 100 at least includes an image capturing device 102 for a photographer, a plurality of image capturing devices 104 for an object to be captured, a viewing angle detection portion 106, an image connection portion 108 and an image generating portion 110.

The see-through image display system 100 is used for, for example, inspecting a vehicle. In the following description, inspecting the engine room of a vehicle is used as an example. However, such application is only used as an example and is not intended to limit the application of the present disclosure. The see-through image display system 100 is, for example, a smartphone or a tablet. The see-through image display system 100 may also be called a portable camera device. The image capturing device 102 for a photographer is configured to capture the photographer. The image capturing device 102 for a photographer mainly obtains information related to the photographer. In addition, the image capturing device 102 for a photographer may also obtain the distance and angle between the photographer and the see-through image display system 100. As an example, the image capturing device 102 for a photographer is, for example, a camera configured on one surface of a smartphone or tablet to capture the photographer.

The multiple image capturing devices 104 for an object to be captured are configured to capture the object to be captured as the target object. As an example, the image capturing device 104 for an object to be captured is a camera configured on the other surface of a smartphone or tablet to capture an object to be captured.

Figure 2A:
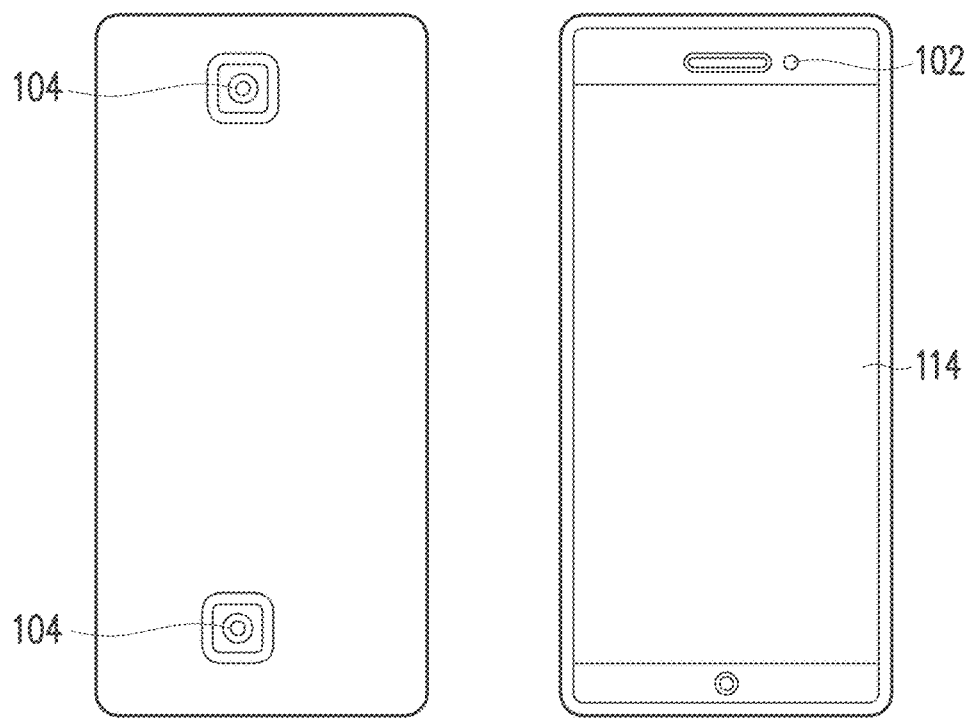
FIG. 2A and FIG. 2B are schematic configuration diagrams of an image capturing device for a photographer and an image capturing device for an object to be captured according to an embodiment of the present disclosure.
Figure 2B:
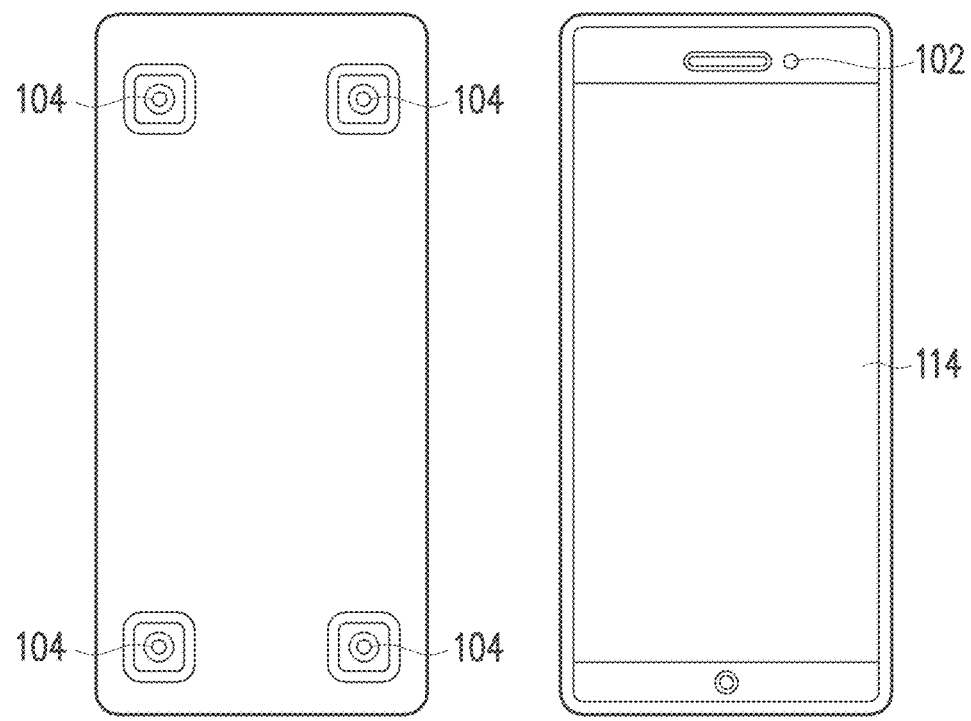

FIG. 2A and FIG. 2B are schematic configuration diagrams of an image capturing device for a photographer and an image capturing device for an object to be captured according to an embodiment of the present disclosure. As shown in FIG. 2A or FIG. 2B, FIG. 2A or FIG. 2B exemplifies the configuration position of the image capturing device 102 for a photographer. Also, FIG. 2A shows that the see-through image display system 100 has two image capturing devices 104 for an object to be captured, which are respectively disposed on the upper and lower sides of the see-through image display system 100 (relative to the length direction of the see-through image display system 100). FIG. 2B shows that the see-through image display system 100 has four image capturing devices 104 for an object to be captured, which are respectively disposed at four corners of the see-through image display system 100.

The viewing angle detection portion 106 detects the viewing angle of the photographer based on the image of the photographer captured by the image capturing device for a photographer.

The image connection portion 108 connects an overlapping portion of the images of an object to be captured that are captured by the plurality of image capturing devices 104 for an object to be captured to connect the plurality of images.

The image generating portion 110 generates a see-through image by performing homograph transformation on a plurality of images of an object to be captured connected by the image connection portion 108 based on the viewing angle of the photographer.

According to an embodiment of the present disclosure, as an optional implementation, the see-through image display system 100 shown in FIG. 1 may further include: an image area limiting portion 112. The image area limiting portion 112 limits the viewing angle of one end of the image of the object to be captured that is captured by the plurality of image capturing devices for an object to be captured along the viewing angle detected by the viewing angle detection portion 106.

In the above embodiment, the viewing angle detection portion 106, the image connection portion 108, the image generating portion 110, and the image area limiting portion 112 may be implemented as independent components. However, the viewing angle detection portion 106, the image connection portion 108, the image generating portion 110, and the image area limiting portion 112 may be integrated into a single control portion 120 for implementation. This control portion 120 may be independently designed to control each of the above-mentioned portions, or may be a part of the control portion of the image capturing device 102 for a photographer.

The operations of the viewing angle detection portion 106, the image connection portion 108, the image generating portion 110, and the image area limiting portion 112 will be described in further detail below.

Figure 3:
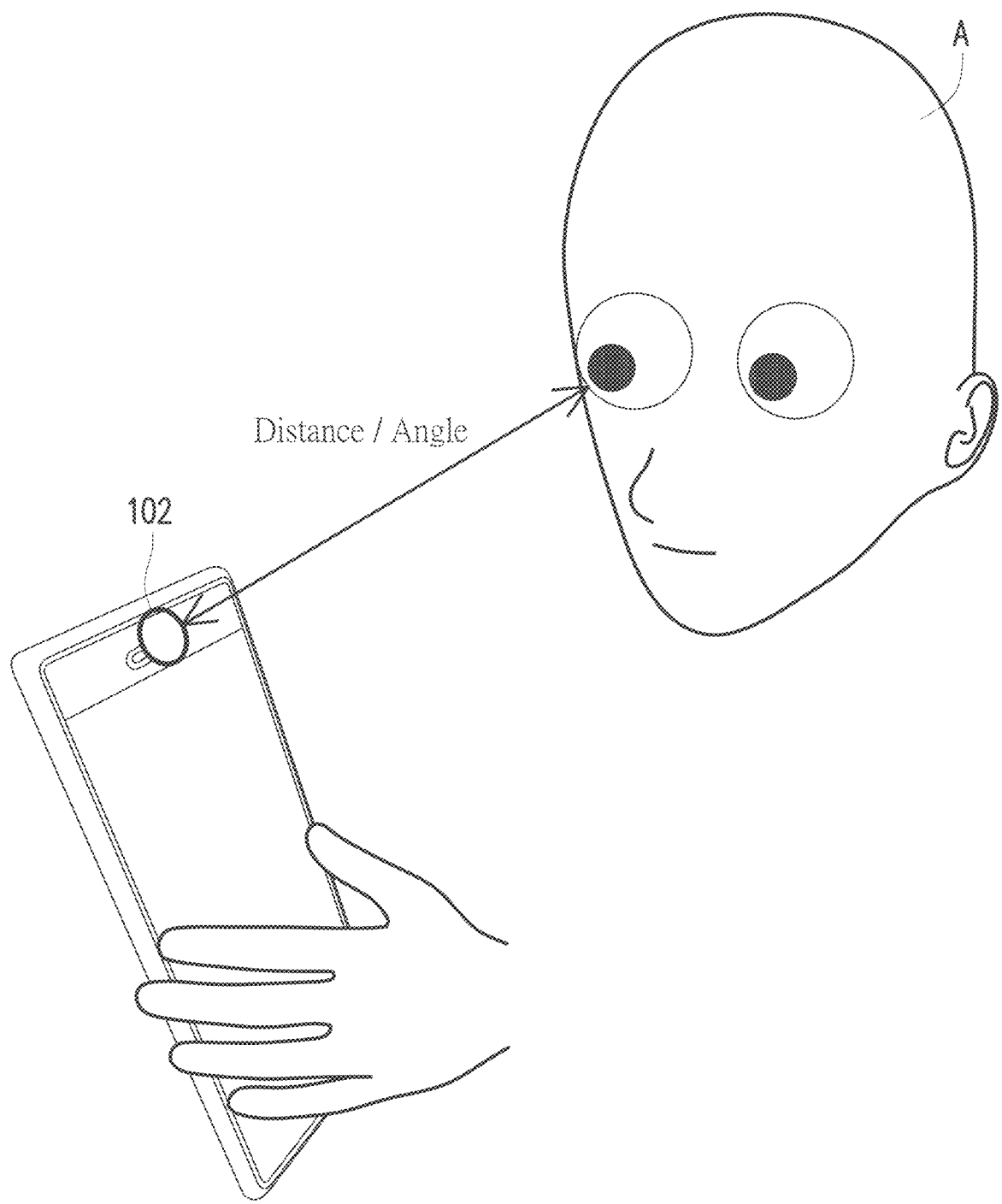
FIG. 3 is a schematic diagram illustrating a situation of acquiring information about a photographer and detecting a viewing angle.
Figure 4:
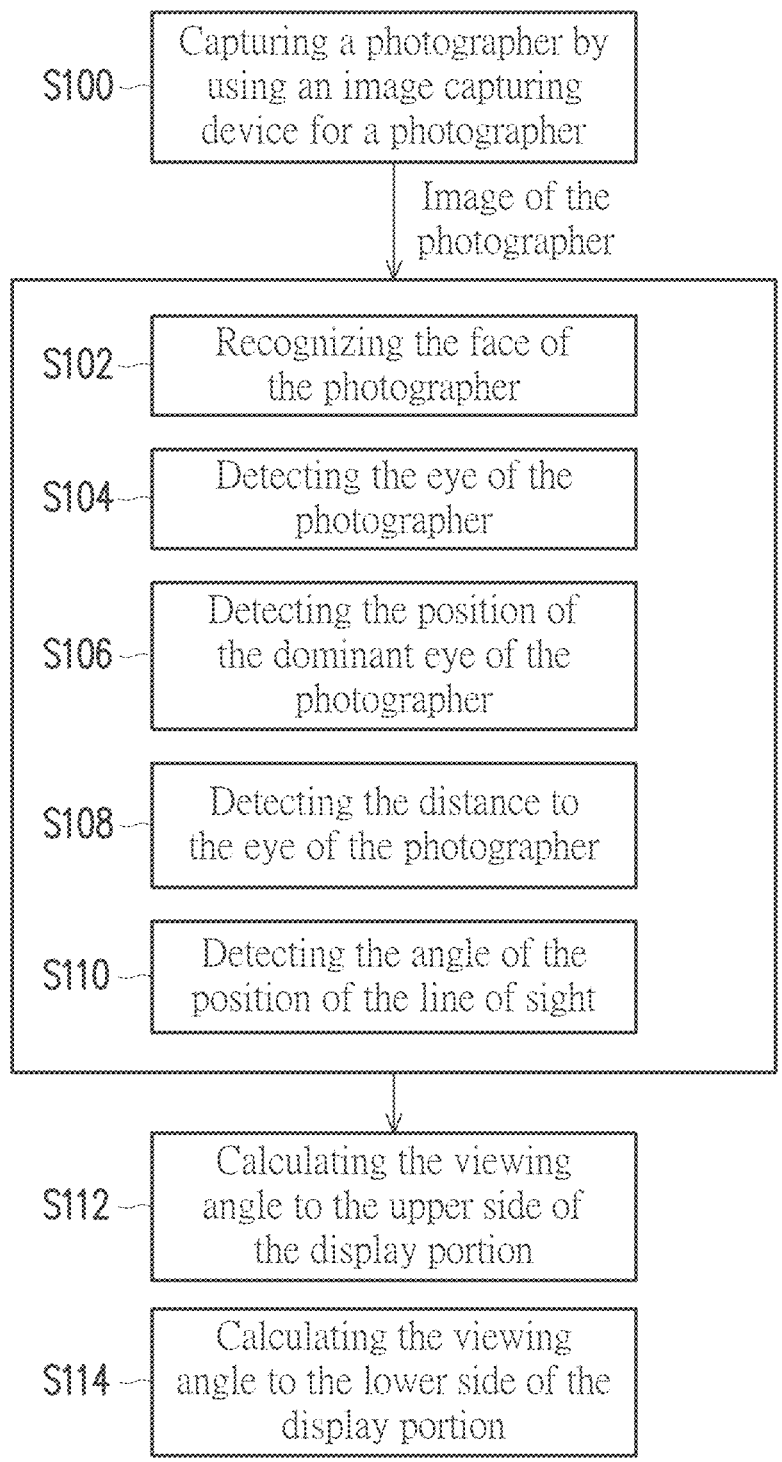
FIG. 4 is a schematic flowchart of obtaining information about a photographer and detecting a viewing angle according to an exemplary embodiment of the present disclosure.

FIG. 3 is a schematic diagram illustrating a situation of acquiring information about a photographer and detecting a viewing angle. FIG. 4 is a schematic flowchart of obtaining information about a photographer and detecting a viewing angle according to an exemplary embodiment of the present disclosure. Obtaining the photographer's information, facial recognition and so on are existing technologies, and any existing method may be adopted, the present disclosure is not particularly limited. The following description is only an example.

The present disclosure is directed to detecting the viewing angle (field of view) of an image of the photographer, that is, the viewing angle of the photographer A detected by the viewing angle detection portion 106 of the see-through image display system 100.

As shown in FIG. 3 and FIG. 4, first in step S100, the image capturing device 102 for a photographer of the see-through image display system 100 is activated. For example, the switch key may be pressed in the shooting mode of the see-through image display system 100 to capture the photographer through the camera that captures the photographer, that is, the image capturing device 102 for a photographer, thereby obtaining an image of the photographer.

Next, facial recognition may be performed on the photographer A in step S102. Here, for example, the facial information (three-dimensional shape data) of the photographer (user) A is recorded in advance in the memory of the see-through image display system 100, so that the distance to the image capturing device 102 for a photographer (i.e., camera) may be estimated based on the size of the face of the photographer A during "facial recognition". Also, in head shape recognition, depth cameras may also be used for facial recognition.

In step S104, the eyes of the photographer A are detected. In step S106, the position of the dominant eye of the photographer A is detected. During facial recognition, the positions of two "eyes" may be detected, and the position of the "dominant eye" when viewed from the image capturing device 102 for photographer may also be detected. The "dominant eye" may also be recorded in advance in the memory or the like of the see-through image display system 100. In step S108, the distance to the eye of the photographer A is detected. Furthermore, in step S110, the angle of the position of line of sight is detected.

In step S112, the viewing angle to the upper side of the display portion 114 is calculated. In step S114, the viewing angle to the lower side of the display portion 114 is calculated. Steps S112 and S114 correspond to the operations performed by the viewing angle detection portion 106 described above.

Figure 5A:
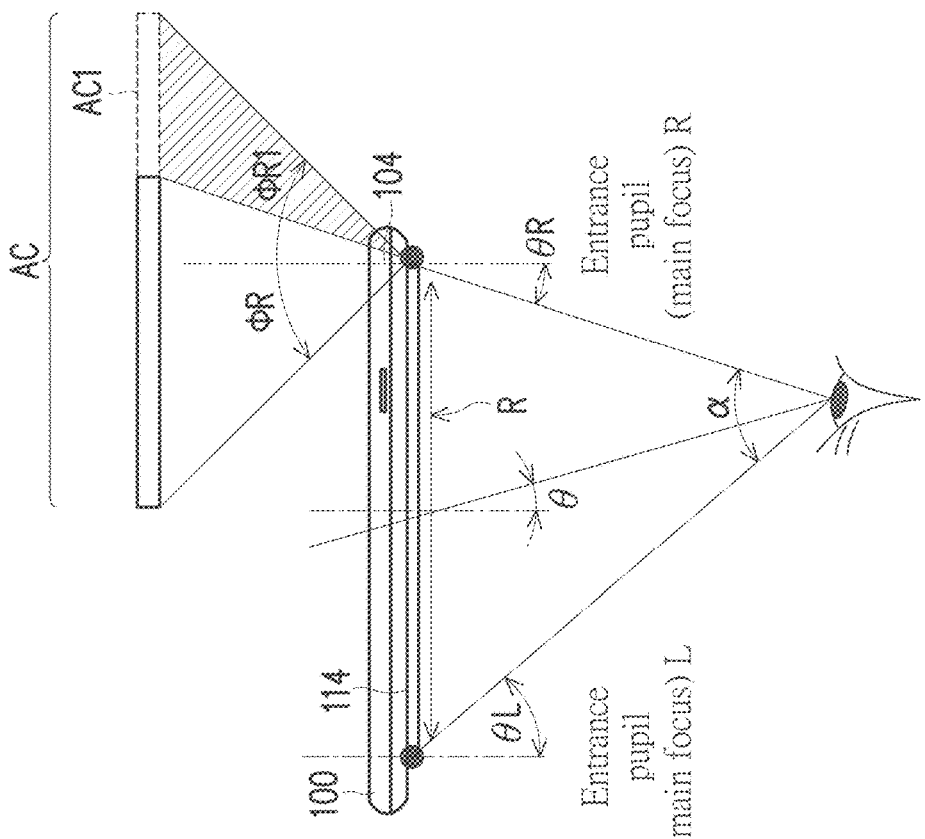
FIG. 5A and FIG. 5B are illustrations of the definitions of optical parameters required in the embodiments of the present disclosure.
Figure 5B:
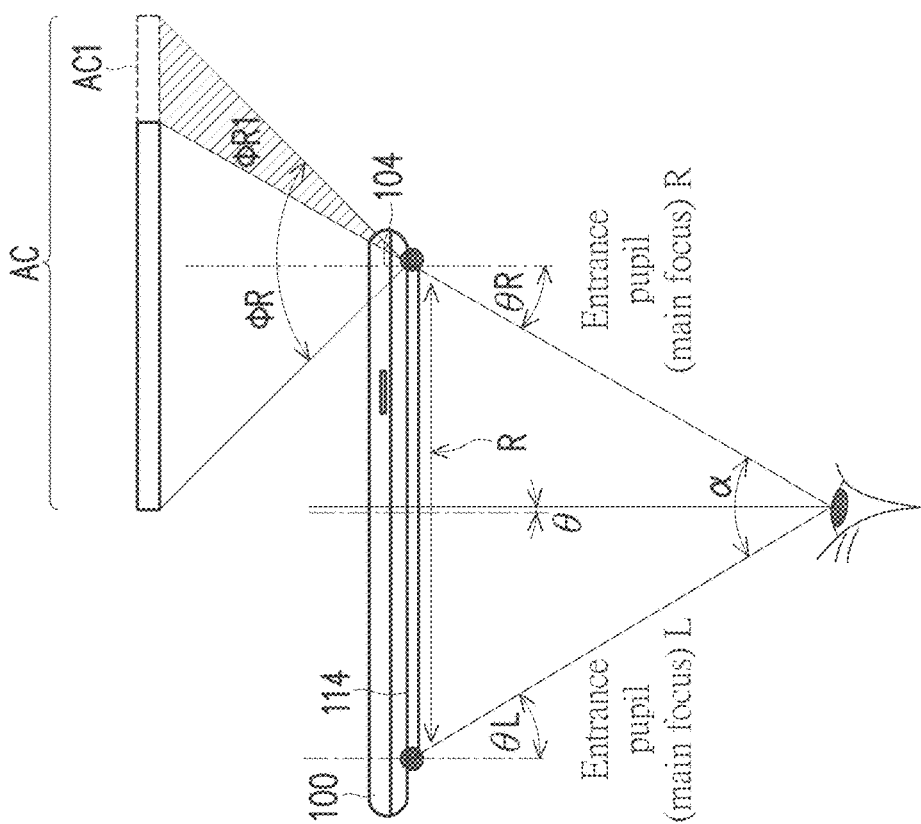

Before continuation of the description, some key terms adopted by the present disclosure are first defined. FIG. 5A and FIG. 5B illustrate the definition of various optical parameters required in the embodiments of the present disclosure. FIG. 5A and FIG. 5B illustrate that the eyes of the photographer A are in different positions of line of sight. In the situation shown in FIG. 5A, the position of the eye of the photographer A is substantially located in the middle of the display portion 114 of the see-through image display system (smartphone as an example) 100, and the incident angle (the angle of incidence into the display portion 114) of the line of sight of the eye of the photographer A is almost 0. In the case shown in FIG. 5A, the position of the eye of the photographer A is substantially located in the middle position away from the display portion 114 of the see-through image display system (smartphone as an example) 100, and the incident angle (the angle of incidence into the display portion 114) of the line of sight of the eye of the photographer A is not 0. That is, there is an angle between the line of sight of the eye and a plane of the display portion 114. The following is definitions of various parameters.

Display range R: From one end to the other end of the display portion of a smartphone Viewing angle φ of camera: The maximum range that the camera is able to capture.

Field of view: The range that a person can visually recognize.

Viewing angle α: The angle required for seeing the display range in the field of view.

Line of sight L: A connecting line from the eye position to the center of the screen of the display portion.

Right line of sight LR1: A connecting line from the eye position to the right end of the screen of the display portion.

Left line of sight LL1: A connecting line from the eye position to the left end of the screen of the display portion.

Incident angle θ of line of sight: The incident angle from the eye position to the center of the screen of the display portion.

Incident angle θR of right line of sight: The incident angle from the eye position to the right end of the screen.

Incident angle θL of left line of sight: The incident angle from the eye position to the left end of the screen.

In the above definitions, the camera in the viewing angle φ of camera refers to the above-mentioned the image capturing device 104 for an object to be captured. In addition, for simplicity of illustration, FIG. 5A and FIG. 5B only illustrate one image capturing device 104 for an object to be captured. When there are two or more image capturing devices 104 for an object to be captured, they are defined in the same way. In addition, in FIG. 5A and FIG. 5B, the image range captured by the image capturing device 104 for an object to be captured is AC. The slash portion outside the extended line of sight LR2 extending from the right line of sight LR1 of the eye of the photographer A is a portion other than the viewing angle α of the eye of the photographer A. Therefore, in subsequent processing, the above-mentioned image area limiting portion 112 cuts the image range AC1 outside the field of view (details will be described later).

Figure 6:
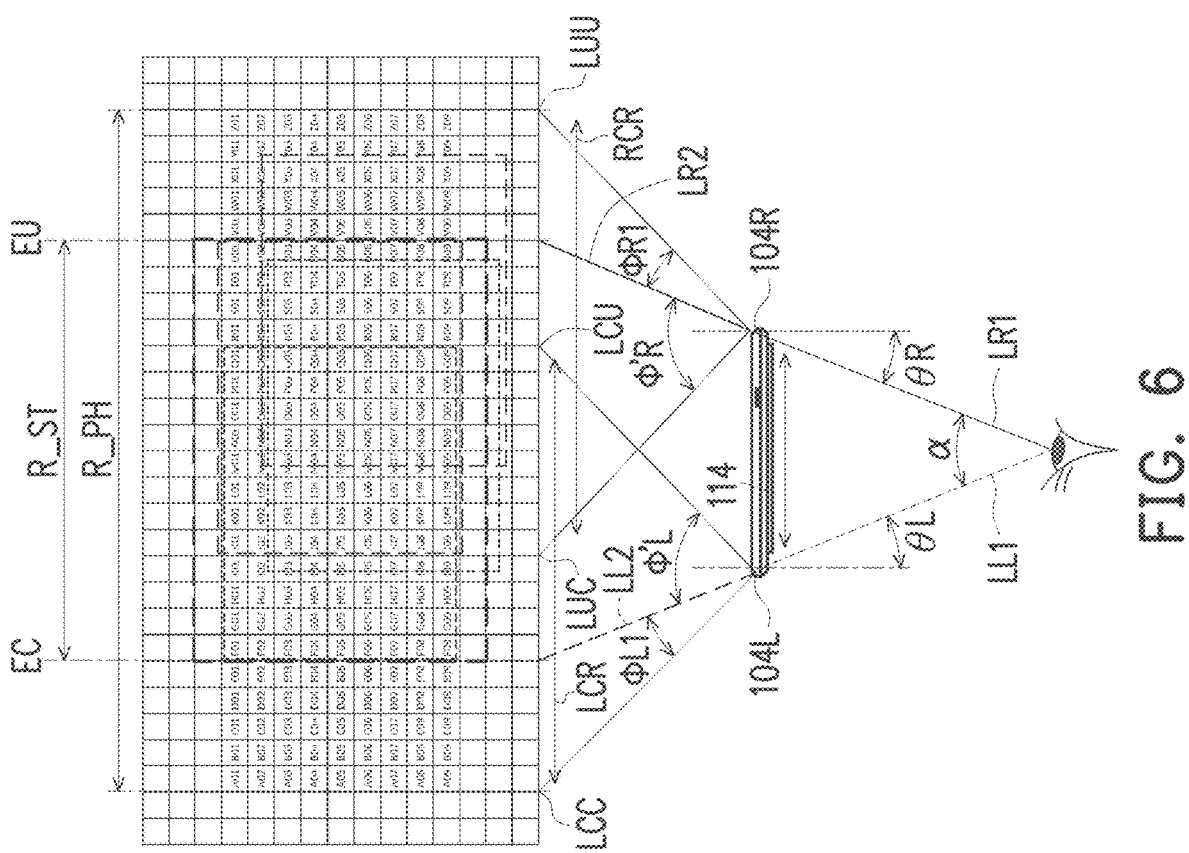
FIG. 6 is a schematic diagram of a see-through image display method according to an embodiment of the present disclosure.

FIG. 6 is a schematic diagram of a see-through image display method according to an embodiment of the present disclosure. In FIG. 6, two image capturing devices 104 for an object to be captured are used as examples to illustrate the see-through image display method in the embodiment of the present disclosure. The following will be explained in conjunction with the various parameters illustrated in FIG. 5A. Furthermore, taking the horizontally placed see-through image display system 100 as an example, the two image capturing devices 104 for an object to be captured are located on the left and right sides respectively.

As shown in FIG. 6, when the image capturing device 102 for a photographer of the see-through image display system (smartphone as an example) 100 is used to capture the photographer A, the viewing angle detection portion 106 detects the viewing angle of the photographer A based on the image of the photographer. In steps S112 and S114 shown in FIG. 4, the angle of right line of sight from the eye of the photographer A to the display portion 114 and the angle of left line of sight from the eye of the photographer A to the display portion 114 are calculated. That is, the viewing angle α, the incident angle θR of right line of sight, and the incident angle θL of left line of sight are calculated and used as the "viewing angle of the photographer A".

Next, the viewing angle of the camera captured by the right image capturing device 104R for an object to be captured is φR, and the viewing angle range RCR of the image captured by the right image capturing device 104R for an object to be captured is from the lower limit range LUC to the upper limit range LUU. Also, the viewing angle of the camera captured by the left image capturing device 104L for an object to be captured is φL, and the viewing angle range LCR of the image captured by the left image capturing device 104L for an object to be captured is from the lower limit range LCC to the upper limit range LCU. Therefore, the range captured by the two image capturing devices 104R and 104L for an object to be captured is the image capturing range R_PH (viewing angle range LCC to LUU).

Furthermore, the image area limiting portion 112 limits the viewing angle of one end of the image of object to be captured that is captured by the plurality of image capturing devices for an object to be captured along the viewing angle detected by the viewing angle detection portion 106. As shown in FIG. 6, based on the extended line of sight LR2 extending from the right line of sight LR1 of the photographer A, it may be obtained that, in the case where the image capturing viewing angle of the right image capturing device 104R for an object to be captured is φR, the viewing angle φR1 beyond the extended line of sight LR2 is beyond the viewing angle α of the photographer A. Therefore, in the case where the image capturing viewing angle is φR, only the image capturing viewing angle φ'R may be used for see-through image display (φR=φ'R+φR1). Likewise, based on the extended line of sight LL2 extending from the left line of sight LL1 of the photographer A, it may be obtained that, in the case where the image capturing viewing angle of the left image capturing device 104L for an object to be captured is φL, the viewing angle φL1 beyond the extended line of sight LL2 is beyond the viewing angle α of the photographer A. Therefore, in the case where the image capturing viewing angle is φL, only the image capturing viewing angle φ'L may be used for see-through image display (φL=φ'L+φL1).

In addition, the range between the lines of sight LR2 and LL2 extending from the left and right sides is used as the range R_ST for displaying a see-through image, and the range R_ST is between EC and EU. Therefore, through the image area limiting portion 112, the image captured by the right image capturing device 104R for an object to be captured between EU and LUU and the image captured by the left image capturing device 104L for an object to be captured between LCC and EC will be limited for display (i.e. the images will be cut out).

Thereafter, a position avoiding the object to be captured is estimated based on the lower limit range LUC of the right image capturing device 104R for an object to be captured and the upper limit range LCU of the left image capturing device 104L for an object to be captured.

Next, the image to be displayed as a see-through image is generated based on the estimated see-through image display range R_ST between an upper limit EC and a lower limit EU, the lower limit range LUC of the right image capturing device 104R for an object to be captured, and the upper limit range LCU of the left image capturing device 104L for an object to be captured.

Figure 7:
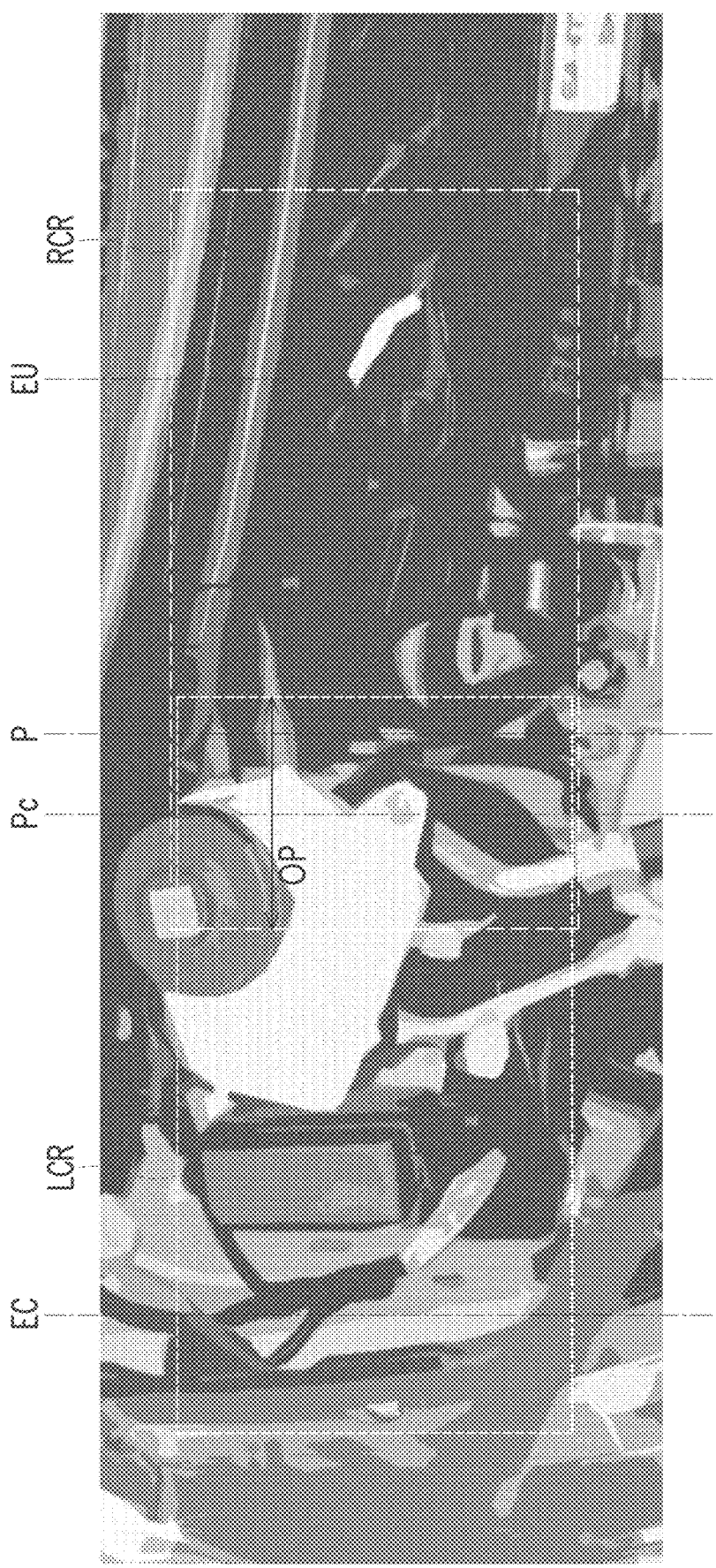
FIG. 7 is an explanatory diagram of an image overlay method according to an embodiment of the present disclosure.

Next, the overlay method of multiple images, that is, the operation method of the above-mentioned image connection portion 108 will be described below. FIG. 7 is an explanatory diagram of an image overlay method according to an embodiment of the present disclosure. FIG. 7 also adopts two image capturing devices 104 for an object to be captured as examples, namely the above-mentioned right image capturing device 104R for an object to be captured and the left image capturing device 104L for an object to be captured.

As shown in FIG. 7, the image captured by the right image capturing device 104R for an object to be captured is the viewing angle range RCR, and the image captured by the left image capturing device 104L for an object to be captured is the viewing angle range LCR. The overlapping part of the two ranges is the overlapping range OP. Also, the range R_ST for displaying the see-through image is between the upper limit EC and the lower limit EU.

Figure 8A:
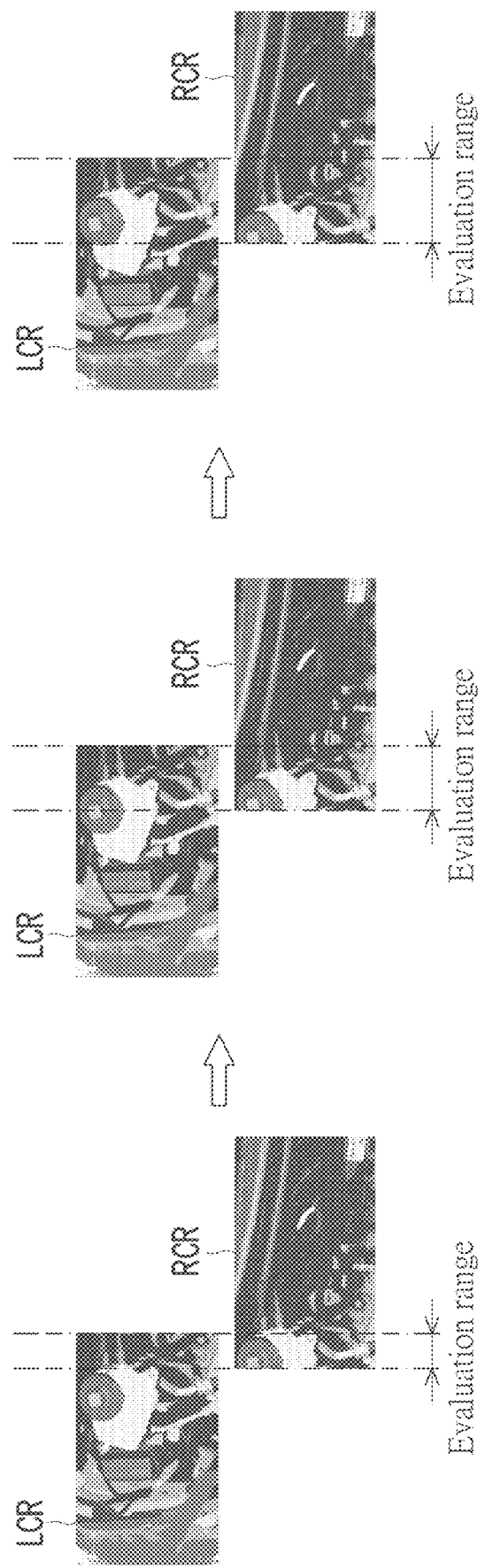
FIG. 8A illustrates a method of determining an overlapping portion of images according to an embodiment of the present disclosure.

The overlapping range OP may be determined, for example, by taking the correlation between two images. It should be noted that because the shooting angles of the right image capturing device 104R for an object to be captured and the left image capturing device 104L for an object to be captured are different, the images in the overlapping range are not equal. FIG. 8A illustrates a method of determining an overlapping portion of images according to an embodiment of the present disclosure.

As shown in FIG. 8, first, a part of the left side of the image RCR captured by the right image capturing device 104R for an object to be captured and a part of the right side of the image LCR captured by the left image capturing device 104L for an object to be captured are taken as the range for evaluating the overlapping portion of the two images, and the widths of the two portions may be substantially the same. Then, the correlation between the two images within this evaluation range is calculated. Thereafter, the evaluation range is adjusted along with calculating the correlation between the two images. In this way, the evaluation range with the highest correlation is determined. Finally, the evaluation range with the highest correlation is taken as the overlapping portion.

Regarding the way to connect two images, first the overlapping range OP is determined. Depending on the embodiment of the disclosure, the connection may be performed in different ways. First, the central part within the overlapping range OP may be used as a connecting line, such as the connecting line Pc in FIG. 7. In addition, the connecting line should be set to be away from the position of the object to be captured.

In addition, FIG. 8B exemplifies another method of determining connecting lines when overlaying images according to an embodiment of the present disclosure. First, the overlapping range OP of the image RCR captured by the right image capturing device 104R for an object to be captured and the overlapping range OP of the image LCR captured by the left image capturing device 104L for an object to be captured are cut into multiple parts with a certain width. Thereafter, the correlation is calculated for each of the corresponding cut portions in the overlapping portions OP of the image RCR and the image LCR. If the correlation is high, it is estimated that the position is a position where no incongruity will be generated when viewing the object to be captured using either the right image capturing device 104R for an object to be captured or the left image capturing device 104L for an object to be captured.

According to an embodiment of the present disclosure, fast Fourier transform (FFT) is performed on each cut portion of the two images to obtain the frequency component. If there are more high-frequency components, the image is more diverse, indicating that the image has a complex structure. On the contrary, if there are more low-frequency components, it means that important parts have not been captured. The low-frequency component with high correlation is more suitable as a connecting part. Therefore, the part with high correlation in the low-frequency region is used as a candidate for the connecting line, such as the connecting line P in FIG. 7. As for the level of correlation, as an example, if the contrast of pixels in a certain part is almost the same, the level of correlation may be determined as high.

Therefore, after determining the connecting line, the image captured by the right image capturing device 104R for an object to be captured and the image captured by the left image capturing device 104L for an object to be captured may be connected within the range from EC to EU to produce the images required for see-through image display.

Figure 9B:
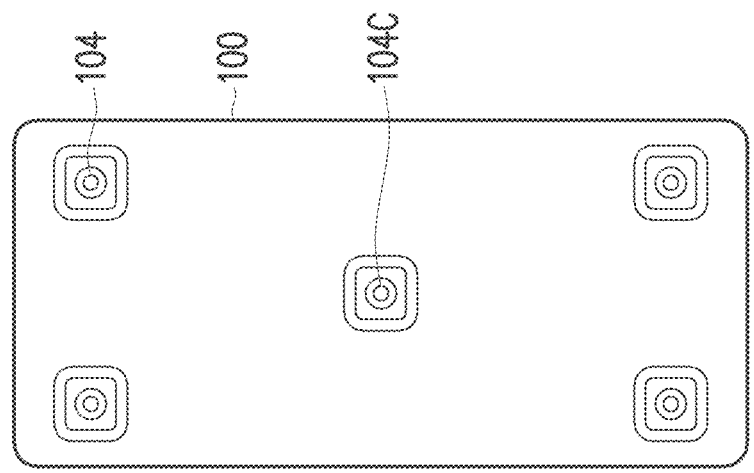
FIG. 9A and FIG. 9B illustrate a configuration example in which the see-through image display system 100 of the present disclosure includes a central camera.
Figure 9A:
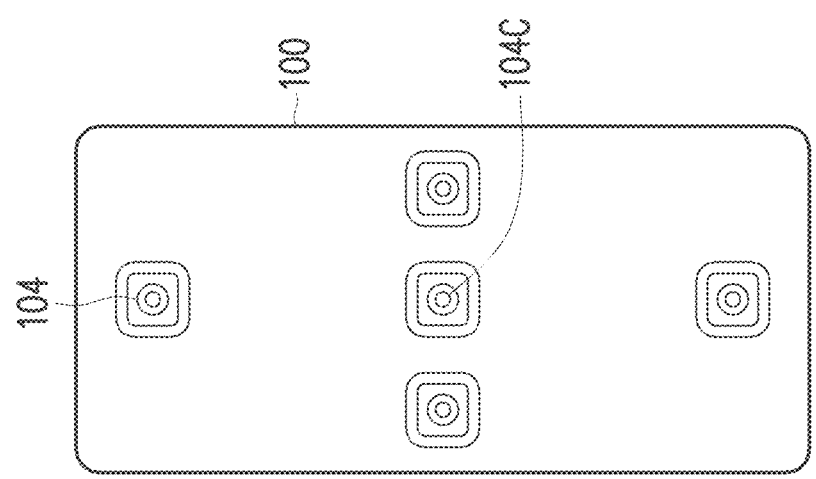
Figure 10:
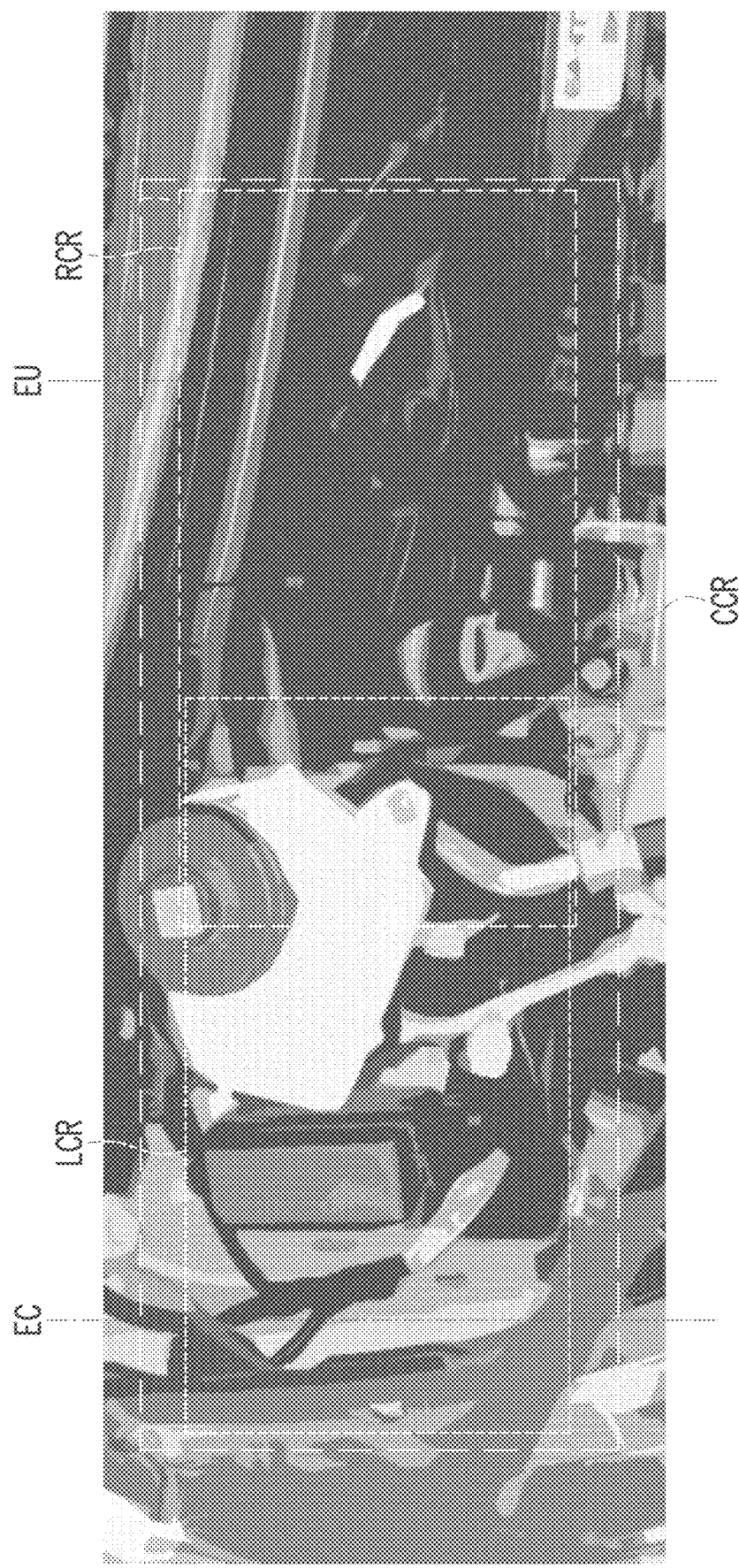
FIG. 10 is an explanatory diagram of another method of generating an image required for see-through image display according to an embodiment of the present disclosure.

In addition, the present disclosure may also generate images required for see-through image display without using the method of connecting images. FIG. 9A and FIG. 9B illustrate a configuration example in which the see-through image display system 100 of the present disclosure includes a central camera. FIG. 10 is an explanatory diagram of another method of generating an image required for see-through image display according to an embodiment of the present disclosure.

As shown in FIG. 9A and FIG. 9B, the see-through image display system 100 is provided with five image capturing devices for an object to be captured, one of which is a central image capturing device 104C for an object to be captured located in the center. The other four shown in FIG. 9A are arranged at the center of each side of the see-through image display system 100, and the other four shown in FIG. 9B are arranged at the four corners of the see-through image display system 100. In addition, the architecture of FIG. 2A may also be used with a central image capturing device 104C for an object to be captured.

With this architecture, FIG. 10 illustrates the architecture provided with a right image capturing device 104R for an object to be captured, a left image capturing device 104L for an object to be captured, and a center image capturing device 104C for an object to be captured as an example. As shown in FIG. 10, the image captured by the right image capturing device 104R for an object to be captured is the range RCR, the image captured by the left image capturing device 104L for an object to be captured is the range LCR, and the image captured by the central image capturing device 104C for an object to be captured is the range CCR. The range CCR of the image captured by the central image capturing device 104C for an object to be captured basically includes the range RCR and the range LCR.

In the case where the central image capturing device 104C for an object to be captured is used, an end portion of the range CCR of the image captured by the central image capturing device 104C for an object to be captured needs to adjusted based on the viewing angle of the photographer detected by the viewing angle detection portion 106 based on the image of the photographer.

First, the end portion position (such as EU) of the range RCR of the image captured by the right image capturing device 104R for an object to be captured and the end portion position (such as EC) of the range LCR of the image captured by the left image capturing device 104L for an object to be captured may be estimated based on the viewing angle (that is, the viewing angle of the photographer detected by the viewing angle detection portion 106).

Thereafter, the position with the highest correlation with the image of the central image capturing device 104C for an object to be captured is acquired by using the columns of images of the right image capturing device 104R for an object to be captured and the left image capturing device 104L for an object to be captured at the position EU and the position EC, and the position with the highest correlation is used as the end portion position. Alternatively, a region that has high correlation with the images of the right image capturing device 104R for an object to be captured and the left image capturing device 104L for an object to be captured is acquired, and the portion within the region limited by the viewing angle is used as the end portion.

In this way, this embodiment does not need to overlay the images captured by each image capturing device 104 for an object to be captured, and only needs to determine the end portion of the image captured by the central image capturing device 104C for an object to be captured.

Next, the plurality of images of an object to be captured connected by the image connection portion 108 are subjected to homograph transformation. As an example, the image for see-through image display is generated after the range RCR of the image captured by the right image capturing device 104R for an object to be captured and the range LCR of the image captured by the left image capturing device 104L for an object to be captured are connected in the above manner. Thereafter, the image generating portion 110 generates a see-through image by performing homograph transformation on the image for see-through image display based on the photographer's viewing angle (generated by the viewing angle detection portion 106 described above).

Figure 11A:
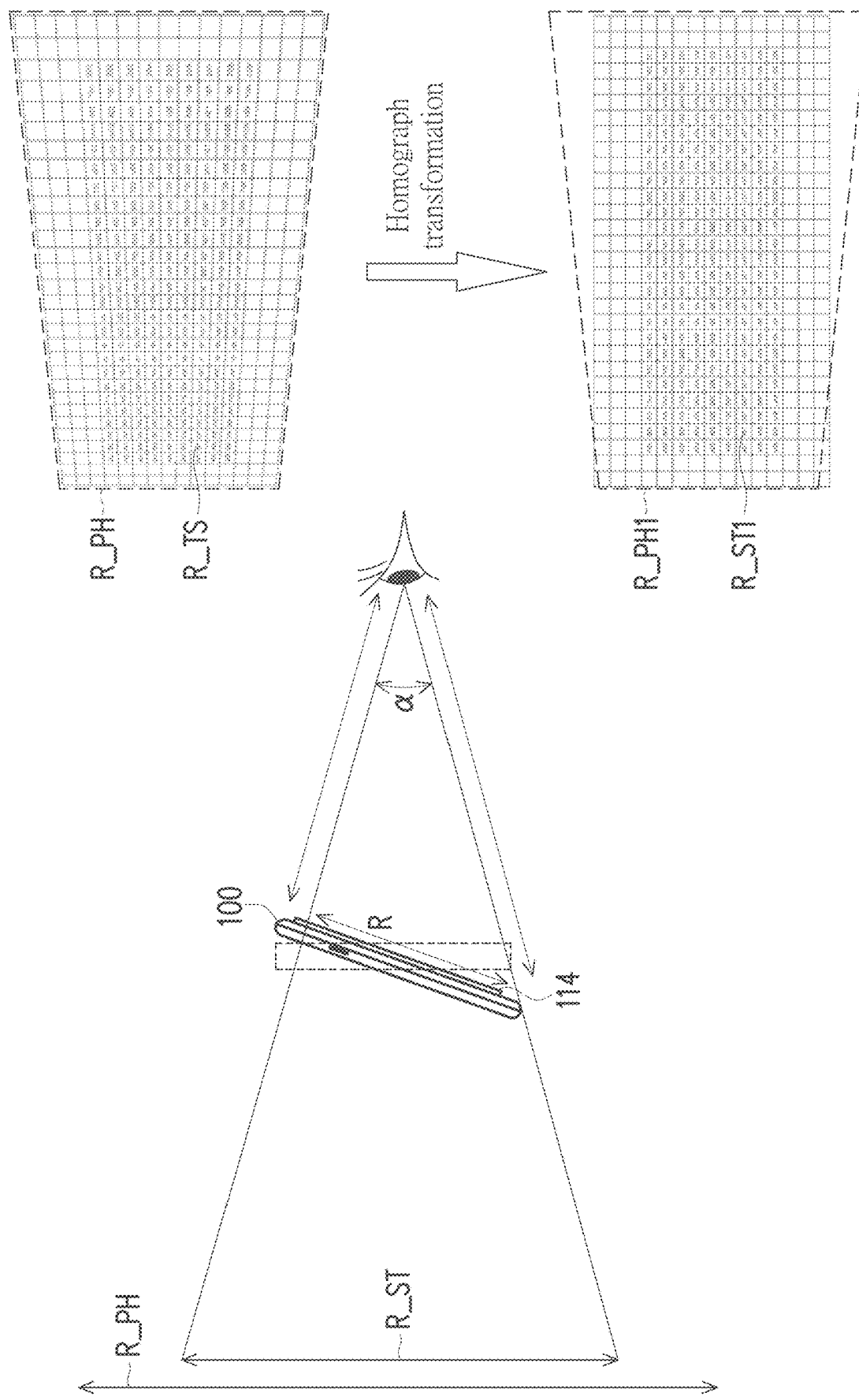
FIG. 11A and FIG. 11B are explanatory examples of performing homograph transformation on multiple connected images of objects to be captured according to an embodiment of the present disclosure.
Figure 11B:
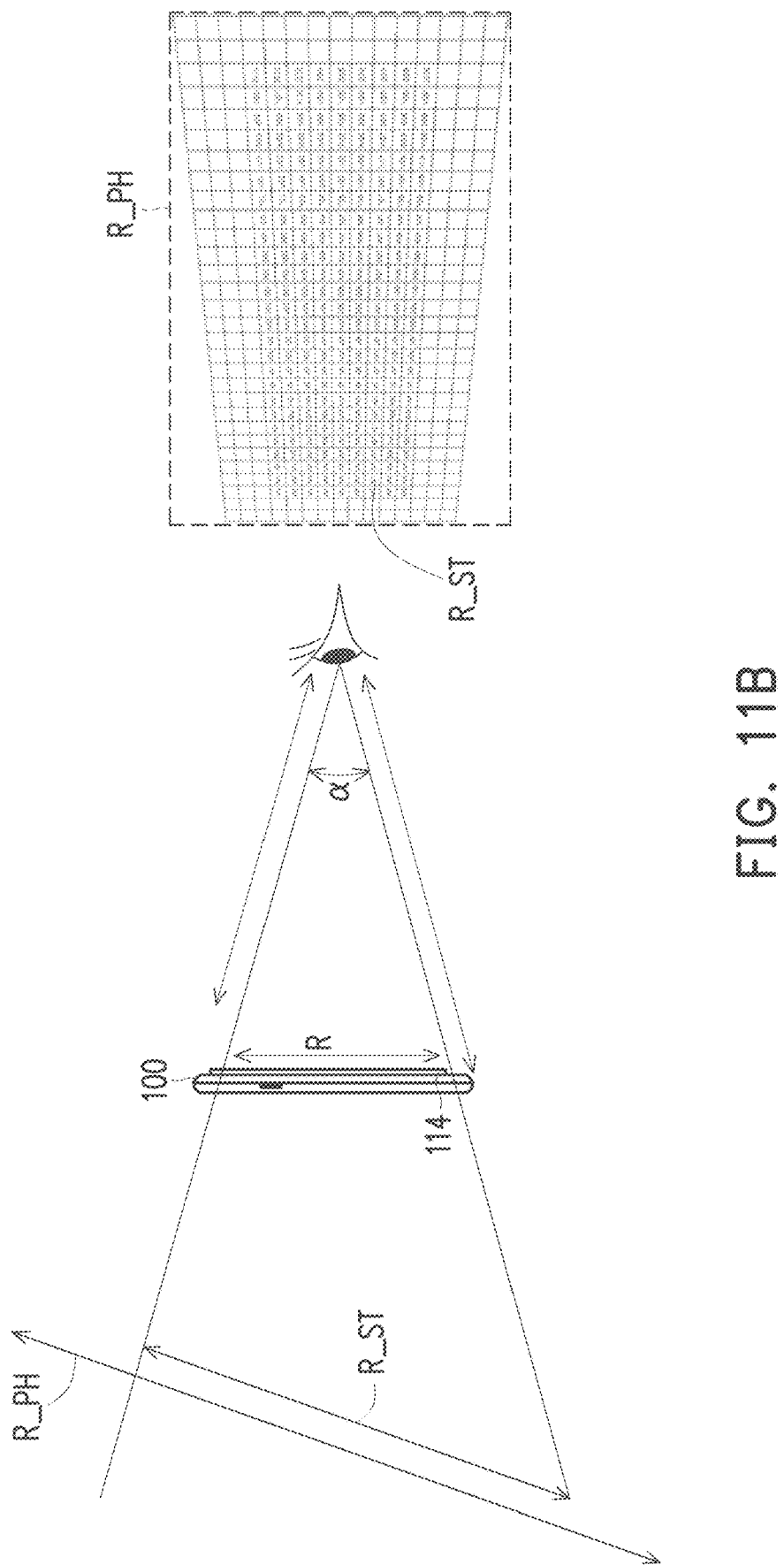

FIG. 11A and FIG. 11B are explanatory examples of performing homograph transformation on multiple connected images of an object to be captured according to an embodiment of the present disclosure. As shown in FIG. 11A, the display portion 114 of the see-through image display system 100 is inclined with respect to the center of line of sight of the photographer A. Under the circumstances, a sense of distance caused by the difference in sight distance will occur. Under such condition, the image generating portion 110 performs homograph transformation on the image R_ST based on the viewing angle of the photographer A detected by the viewing angle detection portion 106, so as to display the image R_ST1 in the condition where the surface of the presumable display portion is virtually perpendicular to the line of sight of the photographer A.

Furthermore, as shown in FIG. 11B, the display portion 114 of the see-through image display system 100 is vertical with respect to the center of line of sight of the photographer A. However, the imaging plane of the object to be captured (perspective area R_ST or imaging area R_PH) is inclined with respect to the center of sight of the photographer A, thus creating a sense of distance. Such state is a perspective display state, so it is not required to perform homograph transformation.

Figure 12:
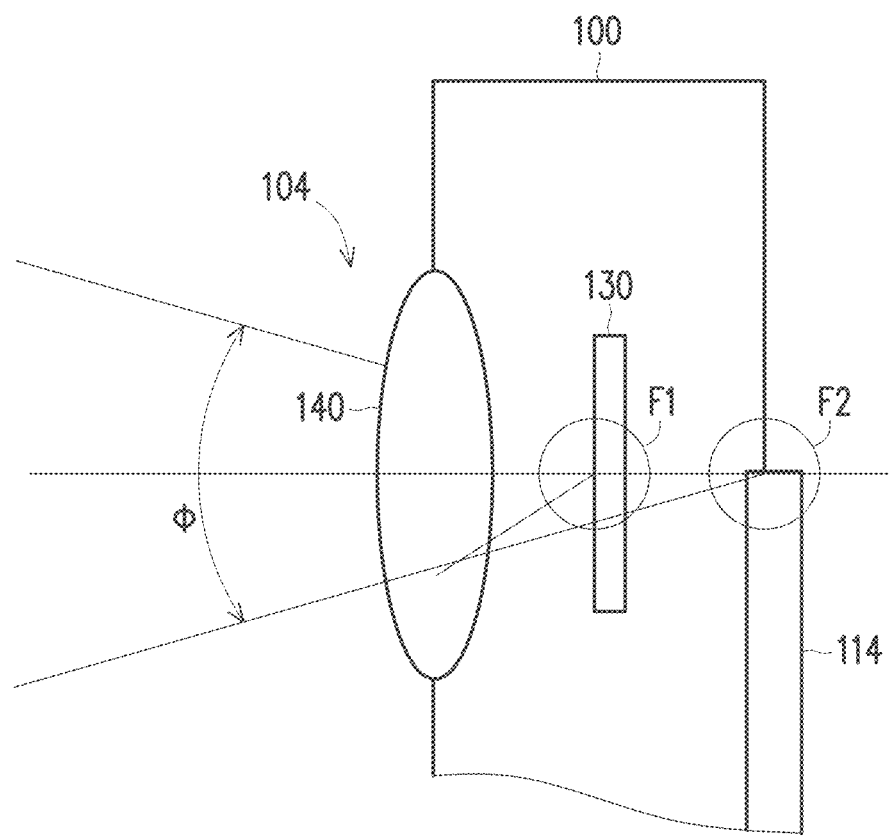
FIG. 12 illustrates the focus design of the image capturing device for an object to be captured according to an embodiment of the present disclosure.

FIG. 12 illustrates the focus design of the image capturing device for an object to be captured according to the embodiment of the present disclosure. In order to achieve the see-through image display of the present disclosure, the lens focus of the image capturing device 104 for an object to be captured of the see-through image display system (smartphone) 100 needs to be adjusted. As shown in FIG. 12, the image capturing device 104 for an object to be captured has a lens 140 and an image sensor 130 behind the lens 140 of the image capturing device 104 for an object to be captured for imaging the object to be captured. The lens 140 of the image capturing device 104 for an object to be captured has a viewing angle q. The focus of the lens of the image capturing device 104 for an object to be captured is generally located at position F1. However, according to the embodiment of the present disclosure, the position of the focus of the lens of the image capturing device 104 for an object to be captured is designed such that when viewed from the outside, the focus F2 is located at the end portion of the display portion 114 of the image capturing device for photographer.

Figure 13A:
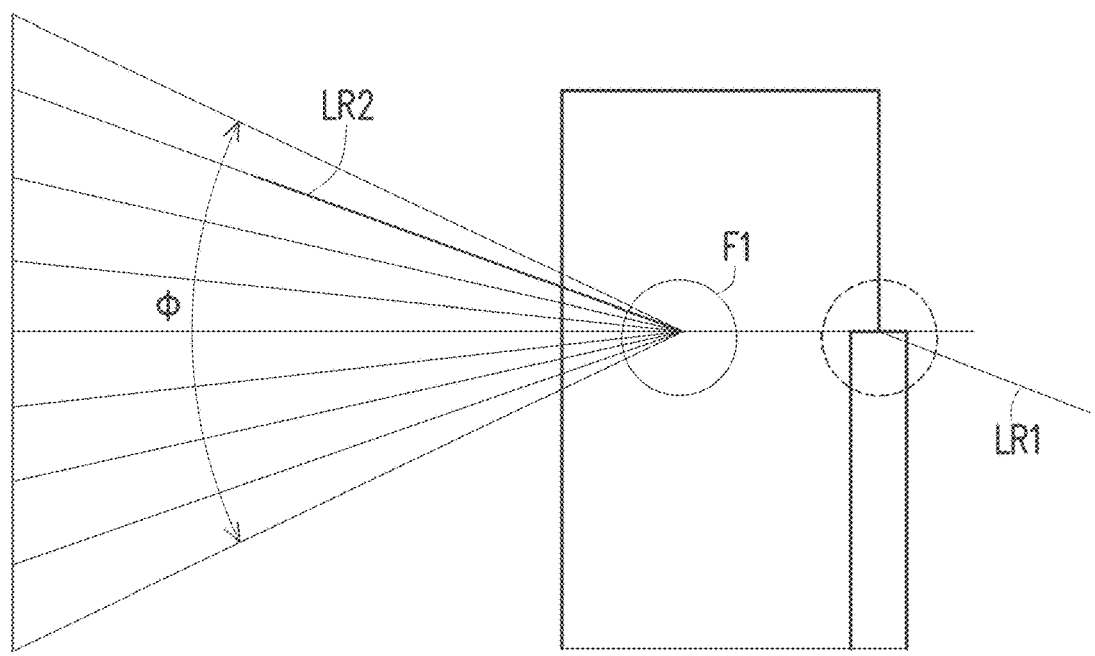
FIG. 13A and FIG. 13B are schematic diagrams illustrating the principle of focus design of the image capturing device for an object to be captured according to embodiments of the present disclosure.

As shown in FIG. 13A, when the focus of the lens of the image capturing device 104 for an object to be captured is generally located at position F1 (i.e., on the image sensor 130 shown in FIG. 12), the right line of sight LR1 of the photographer A (taking the right side as an example) is the connection between the eye and the right side of the display portion 114 of the see-through image display system 100. Under the condition, when the photographer A looks in the direction of the right line of sight LR1, the focus position (entrance pupil position) F1 of the corresponding extended line of sight LR2 does not match the end portion position of the display portion 114. Under the condition, the right line of sight LR1 of the photographer A and the extended line of sight LR2 are not able to be connected to each other, causing incongruity when viewing the final perspective image.

Figure 13B:
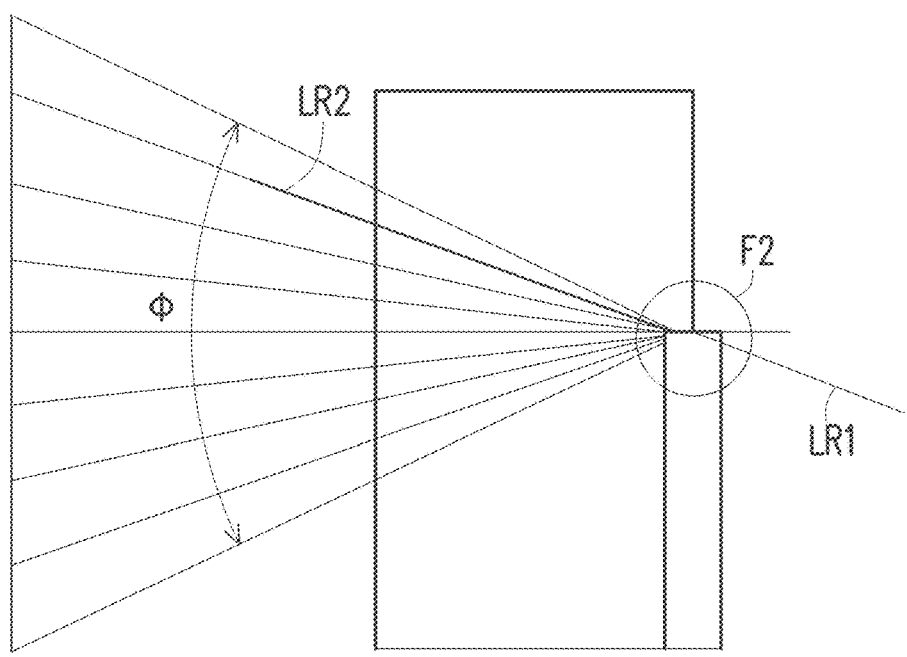

On the contrary, as shown in FIG. 13B, if the focus of the lens of the image capturing device 104 for an object to be captured is set at position F2 (i.e., the position at the end portion of the display portion 114), the right line of sight LR1 of the photographer A and the extended line of sight LR2 are able to be connected to each other, so that there will be no incongruity when viewing the final perspective image.

Finally, it should be noted that the above embodiments are only used to illustrate the technical solution of the present disclosure, but not to limit it. Although the present disclosure has been described in detail with reference to the foregoing embodiments, those of ordinary skill in the art should understand that: The technical solutions described in the foregoing embodiments can still be modified, or some or all of the technical features can be equivalently replaced; and these modifications or substitutions do not deviate from the essence of the corresponding technical solutions from the scope of technical solutions of the embodiments of the present disclosure.

What is claimed is:

1. A see-through image display system, comprising:
   an image capturing device for a photographer, configured to capture the photographer;
   a plurality of image capturing devices for an object to be captured, configured to capture a target object to be captured; and
   a processor, configured to:
      detect a viewing angle of the photographer according to an image of the photographer captured by the image capturing device for the photographer;
      connect an overlapping portion of a plurality of images of the object to be captured that are captured by the plurality of image capturing devices for the object to be captured, so as to connect the plurality of images; and
      perform homograph transformation on the plurality of images of the object to be captured that are connected by the image connection portion based on the viewing angle of the photographer to generate a see-through image.

2. The see-through image display system according to claim 1, wherein the processor is further configured to:
   limit a viewing angle of one end of the image of the object to be captured that is captured by the plurality of image capturing devices for the object to be captured along the viewing angle of the photographer.

3. The see-through image display system according to claim 1, wherein a focus position of a lens of each of the plurality of image capturing devices for the object to be captured is located on an end portion of a display portion of the see-through image display system such that a line of sight of the photographer and an extended line of sight are connected to each other at the end portion of the display portion.

4. A see-through image display method, comprising:
   capturing a photographer to obtain an image of the photographer;
   capturing a target object to be captured;
   detecting a viewing angle of the photographer according to the image of the photographer;
   connecting an overlapping portion of a plurality of images of the object to be captured that are captured, so as to connect the plurality of images;
   performing homograph transformation on the plurality of images of the object to be captured that are connected based on the viewing angle of the photographer to generate a see-through image.

5. The see-through image display method according to claim 4, further comprising:
   limiting a viewing angle of one end of the image of the object to be captured along the detected viewing angle of the image of the photographer.

* * * * *